US011761855B2

(12) United States Patent
Binek et al.

(10) Patent No.: US 11,761,855 B2
(45) Date of Patent: Sep. 19, 2023

(54) APPARATUS AND METHOD FOR TESTING ADDITIVELY MANUFACTURED ENGINE COMPONENTS

(71) Applicant: UNITED TECHNOLOGIES CORPORATION, Farmington, CT (US)

(72) Inventors: Lawrence Binek, Glastonbury, CT (US); David W. Morganson, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 627 days.

(21) Appl. No.: 16/503,190

(22) Filed: Jul. 3, 2019

(65) Prior Publication Data
US 2021/0003480 A1    Jan. 7, 2021

(51) Int. Cl.
*G01M 15/14* (2006.01)
*F01D 21/00* (2006.01)
*G01M 99/00* (2011.01)

(52) U.S. Cl.
CPC .......... *G01M 15/14* (2013.01); *F01D 21/003* (2013.01); *G01M 99/007* (2013.01)

(58) Field of Classification Search
CPC ..... B29C 64/188; B29C 64/00; B29C 64/171; B33Y 40/20; B33Y 80/00; B33Y 10/00; F01D 11/00; F01D 11/005; F01D 21/00; F01D 21/003; F01D 25/285; F02C 7/00; F02C 7/28; F05D 2230/30; F05D 2230/31; F05D 2240/55; F05D 2240/70;
(Continued)

(56) References Cited

U.S. PATENT DOCUMENTS 3,926,006 A * 12/1975 Brooks ................. F16L 55/103
62/66
4,267,699 A * 5/1981 Bahrenburg .............. F25D 3/10
62/66
(Continued)

FOREIGN PATENT DOCUMENTS

EP    0503299 A1 *  9/1992    ............ F16L 55/103
GB    2541010       2/2017

OTHER PUBLICATIONS

English machine translation of EP-0503299-A1 (Year: 1992).*
European Patent Office, European Search Report dated Nov. 13, 2020 in Application No. 20182816.7.

*Primary Examiner* — Feba Pothen
*Assistant Examiner* — Martin Walter Braunlich
(74) *Attorney, Agent, or Firm* — SNELL & WILMER L.L.P.

(57) ABSTRACT

A method for inspecting a component made using an additive manufacturing process, the component having an internal conduit, is disclosed. In various embodiments, the method includes the steps of: attaching a fluid-blocking header to the component, the fluid-blocking header having an internal conformal surface configured to mate with an external conformal surface of the component; introducing a plugging media into the internal conduit; activating the fluid-blocking header to freeze the plugging media in a vicinity of the fluid-blocking header; pressurizing the internal conduit of the component; and analyzing a fluid flow characteristic at an outlet of the component to assess an occurrence of a blockage within the internal conduit.

16 Claims, 8 Drawing Sheets

(58) Field of Classification Search
CPC . F05D 2260/83; F16L 55/103; F16J 15/0887; F16J 15/50; F16K 37/0075; G01M 3/00; G01M 3/02; G01M 15/14; G01M 99/007; G01N 15/08; Y02T 50/60; B22F 2005/005; B22F 10/00; B22F 10/20; B22F 10/28; F02M 65/001

See application file for complete search history.

(56) References Cited

U.S. PATENT DOCUMENTS

| | | | |
|---|---|---|---|
| 4,453,403 A | 6/1984 | Bussey et al. | |
| 6,408,638 B1 * | 6/2002 | Chen | F16L 55/103 62/66 |
| 7,195,042 B1 * | 3/2007 | Hawie | F01D 25/285 141/83 |
| 2016/0311020 A1 | 10/2016 | Abeshaus et al. | |

* cited by examiner

APPARATUS AND METHOD FOR TESTING ADDITIVELY MANUFACTURED ENGINE COMPONENTS

FIELD

The present disclosure relates to gas turbine engines and, more particularly, to gas turbine engines having fuel rails and other fluid components fabricated via an additive manufacturing process.

BACKGROUND

Conventional gas turbine engines, such as those used to power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases in order to power the compressor and the fan sections. Miniature gas turbine engines operate in much the same way as conventional gas turbine engines operate in that a fuel is combusted in the presence of compressed air to generate high energy gases for producing thrust and powering a compressor. As with a conventional gas turbine engine, a turbine section is used to drive a compressor section to compress air for the combustion process and to drive a fan or eject gases at high velocity to produce thrust.

While miniature gas turbine engines often operate under expendable circumstances, it is nevertheless desirable for the engines to exhibit reliability and, at the same time, be cost effective. Accordingly, as with conventional gas turbine engines, miniature gas turbine engines may benefit from cost and weight savings realized from components fabricated via additive manufacturing processes. Such components may include, without limitation, engine casings having fuel or lubricant conduits running internal to the outer surfaces of such casings. Fuel and lubrication systems may also include components having valves or conduits disposed internal to or bounded by the outer surfaces of such components. Non-destructive inspection of the integrity of the various conduits running internal to such components fabricated via additive manufacturing processes often present challenges.

SUMMARY

A method for inspecting a component made using an additive manufacturing process, the component having an internal conduit, is disclosed. In various embodiments, the method includes the steps of: attaching a fluid-blocking header to the component, the fluid-blocking header having an internal conformal surface configured to mate with an external conformal surface of the component; introducing a plugging media into the internal conduit; activating the fluid-blocking header to freeze the plugging media in a vicinity of the fluid-blocking header; pressurizing the internal conduit of the component; and analyzing a fluid flow characteristic at an outlet of the component to assess an occurrence of a blockage within the internal conduit.

In various embodiments, the component is an engine casing and the internal conduit includes a fuel rail, the fuel rail fluidly coupled to a plurality of fuel injectors. In various embodiments, the attaching the fluid-blocking header to the component includes attaching a first fluid-blocking header adjacent a first fuel injector. In various embodiments, the activating the fluid-blocking header to freeze the plugging media in the vicinity of the fluid-blocking header includes running a coolant through the first fluid-blocking header. In various embodiments, the analyzing the fluid flow characteristic at the outlet of the component to assess the occurrence of the blockage within the internal conduit includes measuring at least one of a flow rate or a pressure at one or more of the plurality of fuel injectors. In various embodiments, the attaching the fluid-blocking header to the component includes attaching a second fluid-blocking header adjacent a second fuel injector. In various embodiments, the analyzing the fluid flow characteristic at the outlet of the component to assess the occurrence of the blockage within the internal conduit includes measuring at least one of the flow rate or the pressure at one or more of the plurality of fuel injectors positioned between the first fuel injector and the second fuel injector.

In various embodiments, the component is a fluid manifold and the internal conduit includes an inlet, a first passageway fluidly coupled to a first outlet and a second passageway fluidly coupled to a second outlet. In various embodiments, the attaching the fluid-blocking header to the component includes attaching the fluid-blocking header adjacent one of the first passageway and the second passageway. In various embodiments, the analyzing the fluid flow characteristic at the outlet of the component to assess the occurrence of the blockage within the internal conduit includes measuring at least one of a flow rate or a pressure at one or more of the first outlet and the second outlet. In various embodiments, the first outlet and the second outlet are coupled to a main outlet of the component and analyzing the fluid flow characteristic at the outlet of the component to assess the occurrence of the blockage within the internal conduit includes measuring at least one of the flow rate or the pressure at the main outlet.

A fluid-blocking header configured for testing a component made using an additive manufacturing process, the component having an internal conduit, is disclosed. In various embodiments, the fluid-blocking header includes a body having an internal conformal surface configured to mate with an external conformal surface of the component; and a cooling system coupled to the body and configured to freeze a plugging media within the internal conduit and adjacent the external conformal surface of the component.

In various embodiments, the cooling system is at least one of a fluid cooler and a thermoelectric cooler. In various embodiments, the component is an engine casing and the internal conduit includes a fuel rail, the fuel rail fluidly coupled to a plurality of fuel injectors spaced circumferentially about the engine casing. In various embodiments, the internal conformal surface of the body includes a concave surface configured to mate with a convex surface of the engine casing adjacent the fuel rail. In various embodiments, the cooling system is the fluid cooler and the body includes a coolant inlet and a coolant outlet.

A method for inspecting an engine casing made using an additive manufacturing process, the engine casing including a fuel rail configured to provide a fuel to a plurality of fuel injectors spaced circumferentially about the engine casing, is disclosed. In various embodiments, the method includes the steps of: attaching a first fluid-blocking header to the engine casing, the first fluid-blocking header having an internal conformal surface configured to mate with an external conformal surface of the engine casing; introducing a plugging media into the fuel rail; activating the first fluid-blocking header to freeze the plugging media in a vicinity of the first fluid-blocking header; pressurizing the fuel rail at a fuel supply inlet of the engine casing; and analyzing a fluid flow characteristic at an outlet of the engine casing to assess an occurrence of a blockage within the fuel rail.

In various embodiments, the attaching the first fluid-blocking header to the engine casing includes attaching the first fluid-blocking header adjacent a first fuel injector and the activating the first fluid-blocking header to freeze the plugging media in the vicinity of the first fluid-blocking header includes running a coolant through the first fluid-blocking header. In various embodiments, the method further includes attaching a second fluid-blocking header adjacent a second fuel injector. In various embodiments, the analyzing the fluid flow characteristic at the outlet of the engine casing to assess the occurrence of the blockage within the fuel rail includes measuring at least one of a flow rate or a pressure at one or more of the plurality of fuel injectors positioned between the first fuel injector and the second fuel injector.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
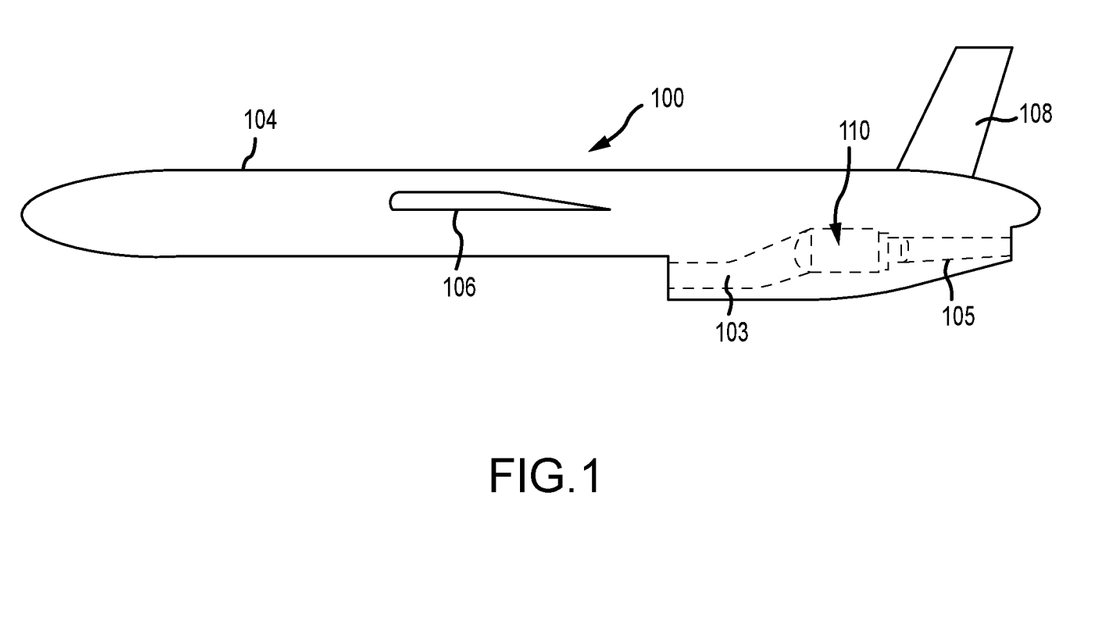
FIG. 1 is a schematic view of a vehicle including a miniature gas turbine engine, in accordance with various embodiments.

Referring now to FIG. 1 a vehicle 100 having a miniature gas turbine engine 110 is illustrated, in accordance with various embodiments. The vehicle 100 includes a fuselage 104, which further includes a wing 106 (or a pair of wings) and a rudder 108 or a stabilizer. In various embodiments, the fuselage 104 also includes an intake duct 103 and an exhaust duct 105, between which is disposed the miniature gas turbine engine 110. The intake duct 103 is open to the outside of the fuselage 104 such that ambient air is permitted to enter the miniature gas turbine engine 110. As described further below, in various embodiments, the miniature gas turbine engine 110 compresses and mixes the ambient air with a fuel carried onboard the vehicle 100 to carry out a combustion process for producing thrust. Exhaust gas produced by the combustion process is expelled from the miniature gas turbine engine 110 to produce the thrust and is passed from the vehicle 100 through the exhaust duct 105. In various embodiments, the miniature gas turbine engine 110 is coupled to an exterior of the fuselage 104 by conventional means and operates in much the same manner as herein described. The vehicle 100 illustrated in FIG. 1 is representative of various reusable or single-use or expendable applications. For example, in various embodiments, the vehicle 100 may comprise a reconnaissance drone aircraft. Thus, the vehicle 100 is often called upon to perform important missions and flight objectives that benefit from reliable performance of the miniature gas turbine engine 110. Furthermore, it is desirable that the miniature gas turbine engine 110 be inexpensive in order to reduce costs associated with missions in which the vehicle 100 is expendable.

Figure 2A:
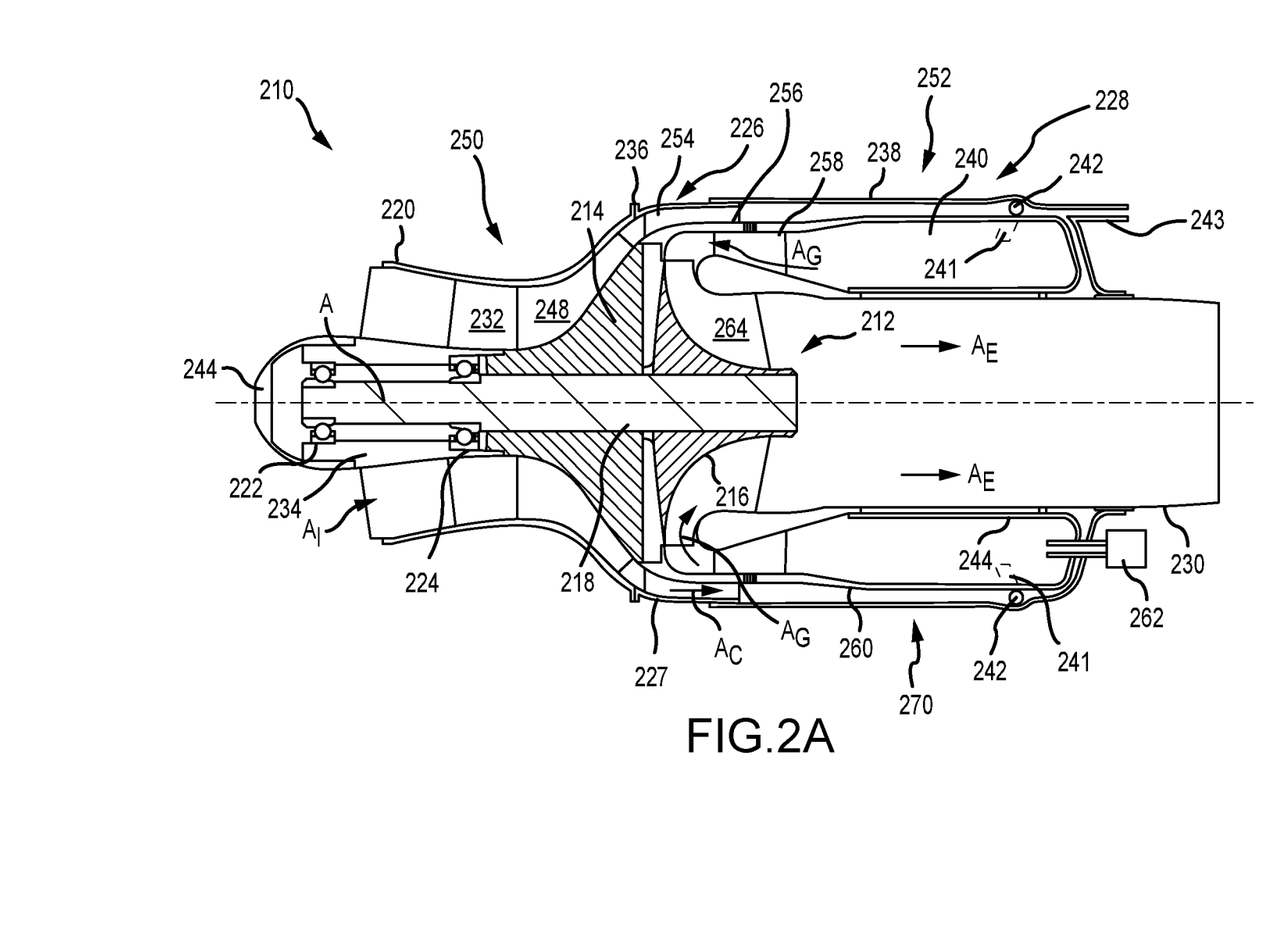
FIGS. 2A and 2B are schematic cross sectional and exploded views of a miniature gas turbine engine, in accordance with various embodiments.
Figure 2B:
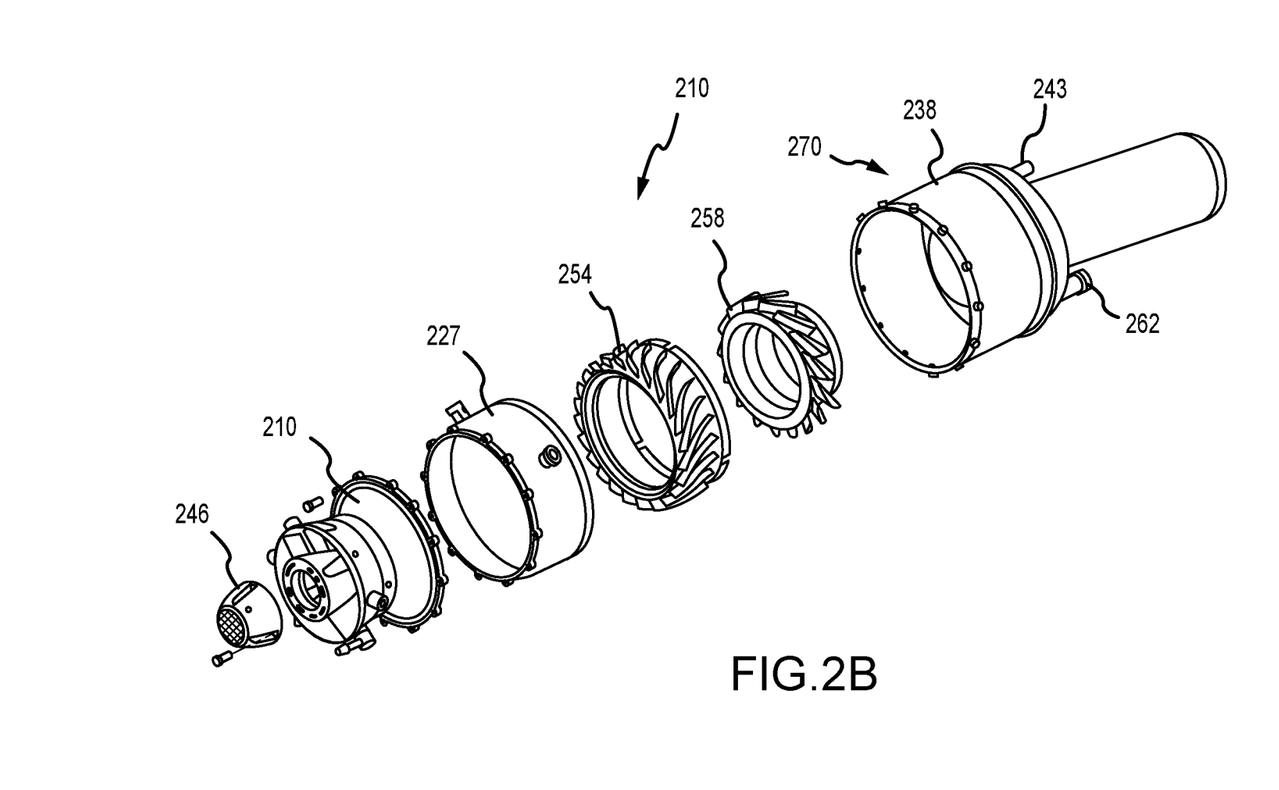

Referring now to FIG. 2, a cross sectional, schematic view of a miniature gas turbine engine 210 is provided. In various embodiments, the miniature gas turbine engine 210 includes a rotor assembly 212, which comprises three main components: a compressor wheel 214, a turbine wheel 216 and a turbine shaft 218. The miniature gas turbine engine 210 also includes an inlet housing 220, a forward bearing 222, an aft bearing 224, a diffuser assembly 226, a combustion system 228, an exhaust nozzle 230, one or more struts 232 and a shaft support 234. In various embodiments, a radial interference fit is utilized to retain the compressor wheel 214 and the turbine wheel 216 on the turbine shaft 218, with the turbine shaft 218 configured to rotate smoothly within the forward bearing 222 and the aft bearing 224 while the turbine wheel 216 rotates within the diffuser assembly 226 and the compressor wheel 214 rotates within the inlet housing 220. The rotating components are configured generally to rotate about a central longitudinal axis A.

In various embodiments, the diffuser assembly 226 is connected to the inlet housing 220 at a flanged coupling 236, and a combustor housing 238 extends axially downstream from the diffuser assembly 226 to surround the combustion system 228. In various embodiments, the combustion system 228 includes a combustor 240 and a fuel rail 242 (or fuel manifold) configured to supply fuel from a fuel supply inlet 243 to the combustor 240. In various embodiments, the combustor 240 comprises an annular hollow body in which the combustion process of the miniature gas turbine engine 210 is carried out. In various embodiments, the combustor housing 238 is connected to the diffuser assembly 226 and to the exhaust nozzle 230. In various embodiments, a radially inner wall 244 of the combustor 240 rests against an external surface of the exhaust nozzle 230.

In various embodiments, the inlet housing 220 is configured to receive a flow of inlet air, $A_I$, from an intake duct, such as, for example, the intake duct 103 described above with reference to FIG. 1. In various embodiments, an end cap 246 diverts the inlet air $A_I$ around the shaft support 234 and into the inlet housing 220. The one or more struts 232 may also function as inlet guide vanes to direct the inlet air $A_I$ into the compressor wheel 214. In various embodiments, the compressor wheel 214 includes a plurality of compressor blades 248, which are disposed on a radially outward exposed face of the compressor wheel 214 to face the inlet housing 220 and the diffuser assembly 226. The compressor blades 248 comprise aerodynamically contoured blades that face the upstream direction where the inlet air $A_I$ is received. The surface of the compressor wheel 214 slopes outward toward the inlet housing 220 so as to comprise a centrifugal or radial flow compressor. The cross sectional area of the plurality of compressor blades 248 decreases along a flow path defined by the compressor wheel 214 such that the intake air $A_I$ is compressed to form a compressed air, $A_C$, where the air exits the inlet housing 220 and enters the diffuser assembly 226.

The diffuser assembly 226 comprises an annular body 227 for connecting a cold section 250 and a hot section 252 of the miniature gas turbine engine 210. The diffuser assembly 226 guides the compressed air $A_C$ into the combustor 240 and the combustion gases $A_G$ away from the combustor 240. In various embodiments, the compressed air $A_C$ enters the diffuser assembly 226 at an outer flow diverter 254, which extends along an outer surface of a diffuser ring 256, where the air is reoriented to flow in the axial direction before entering the combustor 240. The combustion gases $A_G$ exit the combustor 240 and reenter the diffuser assembly 226 at an inner flow diverter 258, which extends along an inner surface of the diffuser ring 256, where the gases are reoriented in flow direction prior to entering the turbine wheel 216. In various embodiments, the hot section 252 comprises an engine casing 270, which may itself comprise a monolithic structure that includes the combustor 240, defined by the radially inner wall 244 and the radially outer wall 260, the fuel rail 242, a fuel injector 241 (or a plurality of fuel injectors) and the exhaust nozzle 230. In various embodiments, the engine casing 270 may be fabricated using an additive manufacturing process.

In various embodiments, the combustor 240 comprises a U-shaped annular body that transforms the downstream flow of the compressed air $A_C$ to an upstream flow of the combustion gases $A_G$ resulting from the combustion process. A radially outer wall 260 of the combustor 240 includes an array of small holes or apertures that permit the compressed air $A_C$ to enter an interior portion of the combustor 240. The fuel rail 242 injects a supply of fuel into the interior portion of the combustor 240 via a fuel injector 241 (or a plurality of fuel injectors). The fuel is ignited with an ignition system comprising an igniter 262 to initiate and sustain the combustion process between the fuel and the compressed air $A_C$. The combustion process generates the combustion gases $A_G$, at high temperature and energy, which are then directed toward the turbine wheel 216 by the inner flow diverter 258.

The combustion gases $A_G$ impinge upon a plurality of turbine blades 264 of the turbine wheel 216, whereupon the plurality of turbine blades 264 extract some of the energy from the combustion gases $A_G$ to turn both the turbine wheel 216 and the compressor wheel 214, which thereby produces the compressed air $A_C$ and sustains the combustion process. The turbine wheel 216 comprises a radially outward exposed face from which the plurality of turbine blades 264 extend. The plurality of turbine blades 264 comprise aerodynamically contoured blades that face the downstream direction such that they expel exhaust gases $A_E$ in the downstream direction. The outward exposed face of turbine wheel 216 slopes inward toward the exhaust nozzle 230 in the direction of flow so as to comprise a radial flow turbine. The cross sectional area of plurality of turbine blades 264 increases such that the exhaust gas $A_E$ is permitted to expand as it exits the turbine wheel 216 and enters the exhaust nozzle 230. The compressor wheel 214, through the turbine shaft 218 and the turbine wheel 216, rotates to continuously compress the inlet air $A_I$ within the plurality of compressor blades 248 to sustain the combustion process. The exhaust gas $A_E$ also produces thrust to drive the miniature gas turbine engine 210 in the forward direction as the exhaust gas $A_E$ exits the exhaust nozzle 230 and, subsequently, an exhaust duct, such as, for example, the exhaust duct 105 described above with reference to FIG. 1.

Figure 3A:
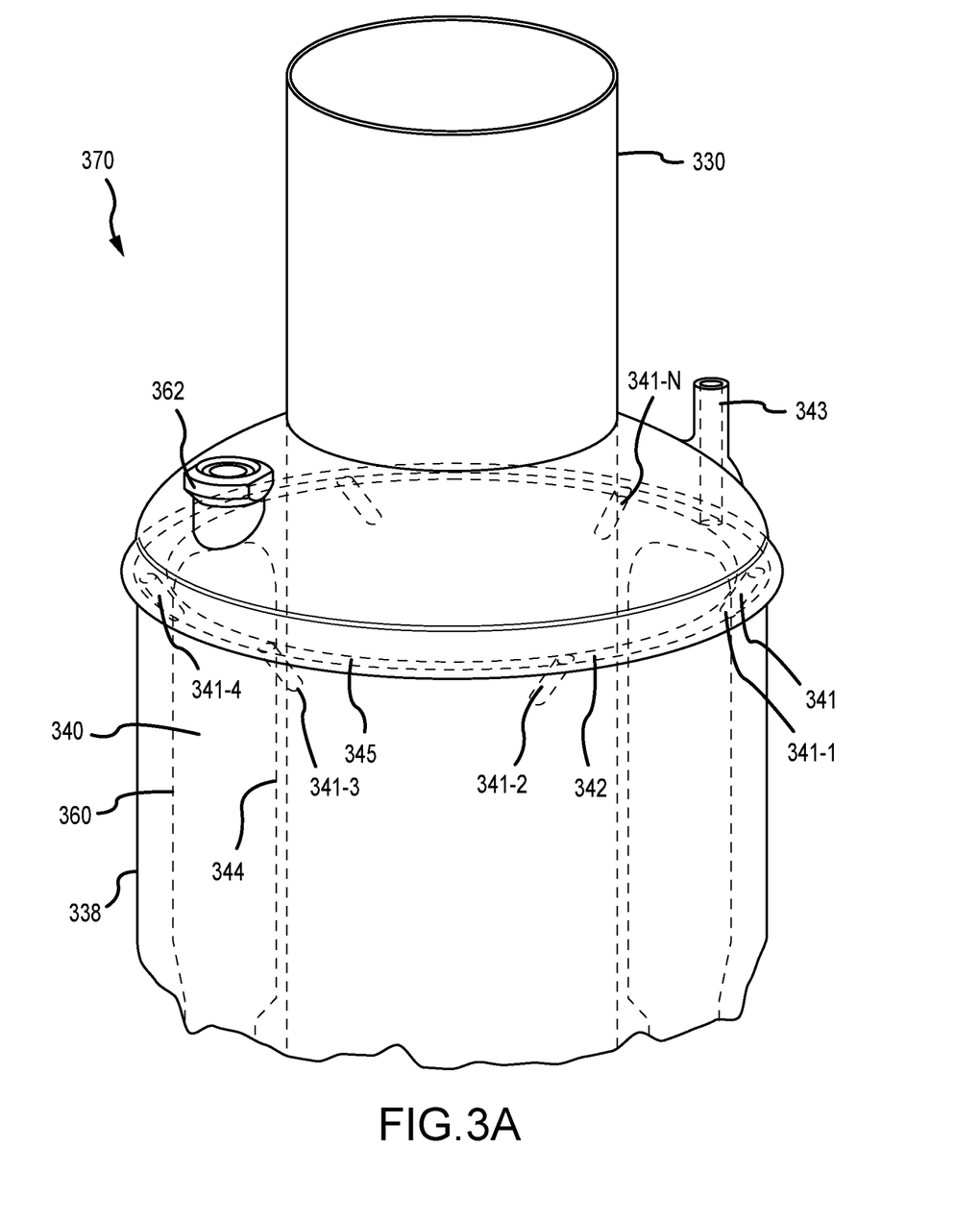
FIGS. 3A and 3B are schematic views of an engine casing including an integrated fuel distribution system, in accordance with various embodiments.
Figure 3B:
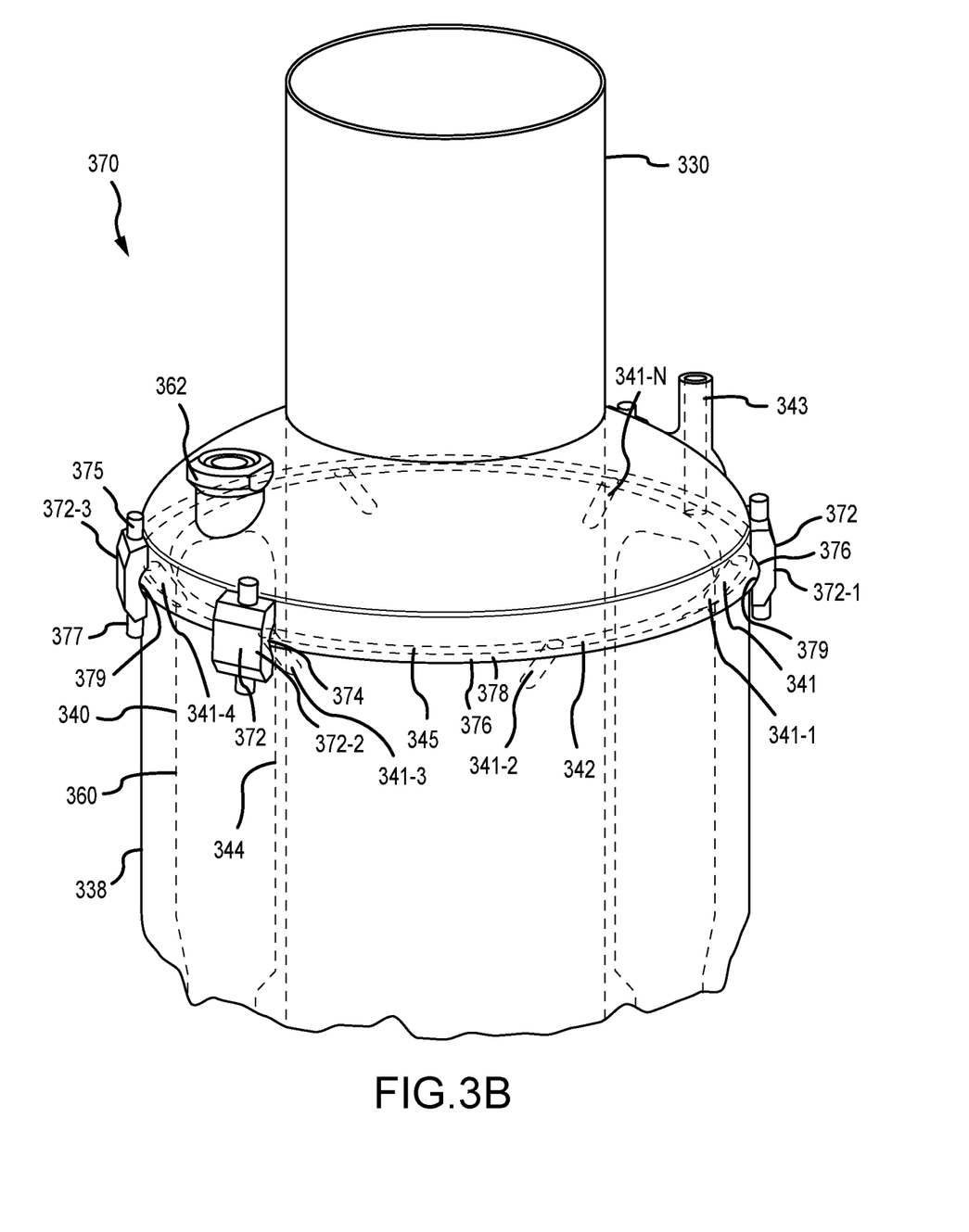

Referring now to FIGS. 3A and 3B, an engine casing 370, similar to the engine casing 270 described above with reference to FIGS. 2A and 2B, is illustrated. In various embodiments, the engine casing includes a combustor 340, defined by a radially inner wall 344 and a radially outer wall 360, a fuel rail 342, a fuel injector 341 and an exhaust nozzle 230. A combustor housing 338 encloses the combustor and the fuel rail 342 and provides an outer shell of the engine casing 370. In various embodiments, the fuel rail 342 is defined by a duct 345 that extends circumferentially about a radially outer portion of the engine casing 370 and is configured to supply fuel from a fuel supply inlet 343 to the combustor 340. In various embodiments, the fuel injector 341 is one of a plurality of fuel injectors, including, for example, a first fuel injector 341-1, a second fuel injector 341-2, a third fuel injector 341-3 and so forth to an N-th fuel injector 341-N, spaced circumferentially about the engine casing 370, with each fuel injector providing a fluid conduit extending from the fuel rail 342 radially inward to an interior portion of the combustor 340. In various embodiments, the engine casing 370, including the various components comprising the engine casing 370, is fabricated using an additive manufacturing process. Following the fabrication process, the fuel rail 342 may be inspected to ensure that one or more blockages did not develop during the fabrication process that would prevent fuel from flowing from the fuel supply inlet 343, through the fuel rail 342 and through each of the plurality of fuel injectors.

Referring more specifically to FIG. 3B, a method and apparatus are described for inspecting a component having an internal conduit, such as, for example, the engine casing 370 having the fuel rail 342, made using an additive manufacturing process. In various embodiments, the apparatus includes a fuel-blocking header 372 (or, more broadly, a fluid-blocking header or a plurality thereof), such as, for example, a first fuel-blocking header 372-1 (or a first fluid-blocking header) or a second fuel-blocking header 372-2 (or a second fluid-blocking header). In various embodiments, the fuel-blocking header 372 includes an internal conformal surface 374 that is configured to mate with an external conformal surface 376 of the component. For example, in various embodiments, the combustor housing 338 may include a portion having a convex surface 378. As illustrated, the convex surface 378 extends circumferentially about the engine casing 370 and, in various embodiments, is configured to accommodate positioning of the fuel rail 342 radially inward of the convex surface 378. The internal conformal surface 374 of the fuel-blocking header 372, conversely, includes a concave surface 379 configured to mate with the convex surface 378, thereby providing a contact surface between the convex surface 378 and the concave surface 379. The contact surface facilitates heat transfer (e.g., conductive heat transfer) between the internal conformal surface 374 of the fuel-blocking header 372 and the external conformal surface 376 of the engine casing 370.

Referring still to FIG. 3B, in various embodiments, the fuel-blocking header 372 includes a coolant inlet 375 and a coolant outlet 377. The coolant inlet 375 is configured to receive a coolant from a coolant source. Once received at the coolant inlet 375, the coolant is routed through an interior of the fuel-blocking header 372 (or through a body or block of material comprising the fuel-blocking header 372) and out the coolant outlet 377. Routing the coolant through the fuel-blocking header 372 causes a temperature drop within the fuel-blocking header 372, where the temperature drop is configured to freeze (e.g., solidify) a plugging fluid introduced into the internal conduit (e.g., the fuel rail 342) in a vicinity of the internal conduit adjacent to where the fuel-blocking header 372 is attached to the component (e.g., the engine casing 370). In various embodiments, the coolant may comprise, for example, liquid nitrogen, liquid carbon dioxide or a highly-salinized water maintained at low-temperatures. In various embodiments, the plugging fluid may comprise, for example, deionized water, vegetable oil or jet fuel.

In various embodiments, a method for inspecting a component having an internal conduit, such as, for example, the engine casing 370 having the fuel rail 342, made using an additive manufacturing process, may be described using the fuel-blocking header 372 or, more specifically, the first fuel-blocking header 372-1 and the second fuel-blocking header 372-2. Referring still to FIGS. 3A and 3B, the method includes attaching the first fuel-blocking header 371-1 to the engine casing 370, such that the internal conformal surface 374 of the fuel-blocking header 372 (or the concave surface 379 thereof) mates with the external conformal surface 376 of the engine casing 370 (or the convex surface 378 thereof), in the vicinity of a fuel injector, such as, for example, the first fuel injector 341-1. In various embodiments, the method then includes introducing a plugging media into the internal conduit (e.g., the fuel rail 342). Once the plugging media fills the internal conduit, the first fuel-blocking header 372-1 is activated to freeze the plugging media within the internal conduit in the vicinity of the first fuel injector 341-1, thereby blocking fluid from exiting the first fuel injector 341-1 into the combustor 340. Once the plugging fluid within or adjacent the first fuel injector 341-1 is frozen, the plugging fluid within the internal conduit may be pressurized to establish a fluid flow from the fuel supply inlet 343, through the fuel rail 342 and out each of the plurality of fuel injectors, excepting for the first fuel injector 341-1. Following establishment of the fluid flow, the flow characteristics at the plurality of fuel injectors other than the first fuel injector 341-1 may be analyzed to assess whether a blockage has occurred within the fuel rail 342 during the additive manufacturing process. In various embodiments, for example, flow rates or pressures at the fuel injectors may be observed or analyzed or, in various embodiments, flow rates or pressures at the fuel supply inlet may be observed or analyzed. In either case, the resulting flow rates or pressures may be compared with theory, such as, for example, with the results of computational fluid dynamics simulations, to assess an occurrence of a blockage within the fuel rail 342.

The foregoing involves positioning the first fuel-blocking header 372-1 at a first location with respect to the fuel rail 342 (e.g., adjacent any of the locations of the plurality of fuel injectors) and analyzing the characteristics of the resulting fluid flow once the plugging media has been frozen at such location. In various embodiments, the method further includes positioning the second fuel-blocking header 372-2 at a second location with respect to the fuel rail 342, thereby enabling the flow characteristics of a subset of the plurality of fuel injectors and the fuel rail, between the first fuel-blocking header 372-1 and the second fuel-blocking header 372-2, to be analyzed. For example, and with continued reference to FIGS. 3A and 3B, the first fuel-blocking header 372-1 may be positioned proximate the second fuel injector 341-2 and the second fuel-blocking header 372-2 may be positioned proximate the N-th fuel injector 341-N. Following freezing of the plugging medial in the vicinity of the second fuel injector 341-2 and the N-th fuel injector 341-N, the flow rate or pressure of the resulting fluid flow entering the fuel supply inlet 343 and exiting the first fuel injector 341-1 may be analyzed to determine if a blockage of the fuel rail 342 between the fuel supply inlet 343 and the first fuel injector 341-1 occurred during manufacture. Placing the first or the second of the fuel blocking headers at other locations about the fuel rail 342 may be strategized to isolate for inspection specific locations or specific regions of the fuel rail 342.

Figure 4A:
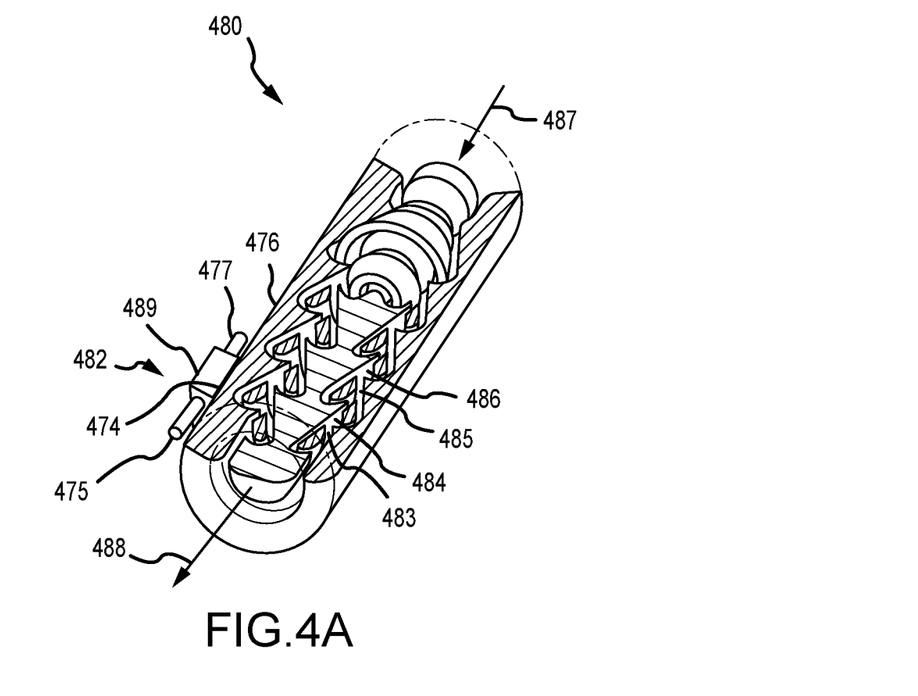
FIGS. 4A and 4B are schematic views of a valve of a fluid system, in accordance with various embodiments.
Figure 4B:
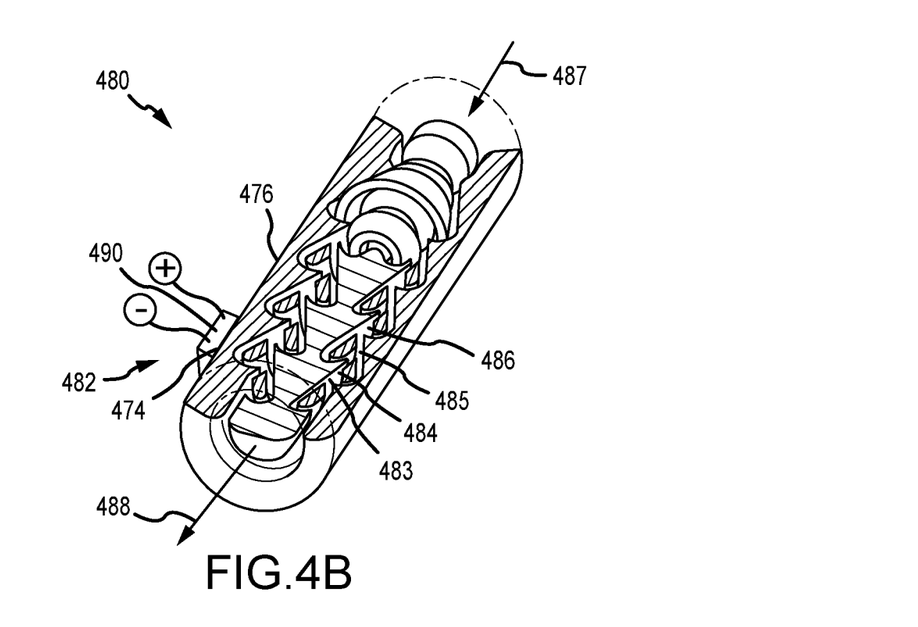

Referring now to FIGS. 4A, 4B, 5 and 6, the method described above is applied more generally to a component fabricated via an additive manufacturing process. Referring to FIGS. 4A and 4B, for example, a fluid manifold 480 in the form of a one-way valve, such as, for example, a Tesla-valve, is illustrated. Following fabrication by an additive manufacturing process, the fluid manifold 480 may be tested for blockage, in accordance with various embodiments. The fluid manifold 480 may comprise a first passageway 483 coupled to a first outlet 484 and a second passageway 485 coupled to a second outlet 486, the passageways in this case being disposed in series relative to one another and comprising the Tesla valve. A fluid-blocking header 482 having an internal conformal surface 474 configured to mate with an external conformal surface 476 of the fluid manifold 480 may be attached to the fluid manifold 480 adjacent one of the first passageway 483 and the second passageway 485. In various embodiments, additional fluid blocking headers may also be positioned about the fluid manifold and adjacent various of the passageways. A plugging media is then introduced into the fluid manifold at an inlet 487. The fluid-blocking header 482 is then activated to freeze the plugging media in the vicinity of the first passageway 483 or the second passageway 485. The internal conduit running through the fluid manifold is then pressurized with a fluid (e.g., the plugging fluid) at the inlet 487 of the component and a fluid flow characteristic at an outlet 488 (or a main outlet) of the component is analyzed to assess an occurrence of a blockage within the first passageway 483 or the second passageway 485. Following the analysis of the flow characteristics, the fluid-blocking header 482 may be moved to a new location on the fluid manifold 480 and the process repeated. In various embodiments, including all embodiments disclosed herein, the flow direction may be reversed such that, for example, the inlet 487 becomes an outlet and the outlet 488 becomes an inlet, with the method for inspecting the component being performed using a reverse flow direction.

In various embodiments, the fluid-blocking header 482 comprises a body and a cooling system coupled to the body or made integral therewith and configured to provide a heat sink to the fluid manifold 480 when activated. For example, in various embodiments, the fluid-blocking header 482 is similar to the fuel-blocking header 372, described above with reference to FIGS. 3A and 3B, and comprises a fluid cooler 489 having a coolant inlet 475 and a coolant outlet 477, as illustrated in FIG. 4A. In various embodiments, the fluid-blocking header 482 may comprise a thermoelectric cooler 490, such as, for example, a Peltier device, configured to provide the heat sink upon application of a voltage difference across the device, as illustrated in FIG. 4B. In either embodiment, the fluid-blocking header 482 provides a contact surface between the internal conformal surface 474 and the external conformal surface 476 and facilitates heat transfer (e.g., conductive heat transfer) between the fluid-blocking header 482 and the fluid manifold 480.

Figure 5:
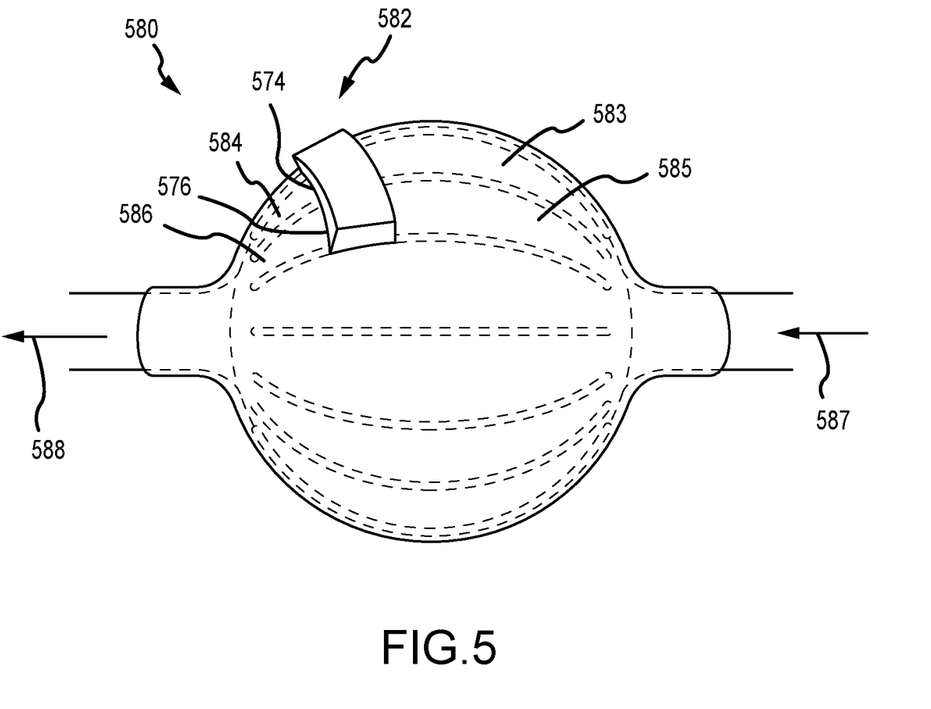
FIG. 5 is a schematic view of a component of a fluid system, in accordance with various embodiments.

Referring now to FIG. 5, a fluid manifold 580 in the form of a spherical body comprising a plurality of passageways between an inlet 587 and an outlet 588 (or a main outlet), is illustrated. Following fabrication by an additive manufacturing process, the fluid manifold 580 may be tested for blockage, in accordance with various embodiments. The fluid manifold 580 may comprise a first passageway 583 coupled to a first outlet 584 and a second passageway 585 coupled to a second outlet 586, the passageways in this case being disposed in parallel relative to one another, with the first and second outlets converging into the main outlet. A fluid-blocking header 582 having an internal conformal surface 574 configured to mate with an external conformal surface 576 of the fluid manifold 580 may be attached to the fluid manifold 580 adjacent one of the first passageway 583, the second passageway 585 or both passageways. In various embodiments, additional fluid blocking headers may also be positioned about the fluid manifold and adjacent various of the passageways. A plugging media is then introduced into the fluid manifold at the inlet 587. The fluid-blocking header 582 is then activated to freeze the plugging media in the vicinity of the first passageway 583 or the second passageway 585 (or both passageways). The internal conduit running through the fluid manifold 580 (and comprising all the passageways, as illustrated, including the first passageway 583 and the second passageway 585) is then pressurized with a fluid (e.g., the plugging fluid) at the inlet 587 of the component and a fluid flow characteristic at the outlet 588 of the component is analyzed to assess an occurrence of a blockage within the first passageway 583, the second passageway 585 or any of the other passageways. Following the analysis of the flow characteristics, the fluid-blocking header 582 may be moved to a new location on the fluid manifold 580 and the process repeated.

Figure 6:
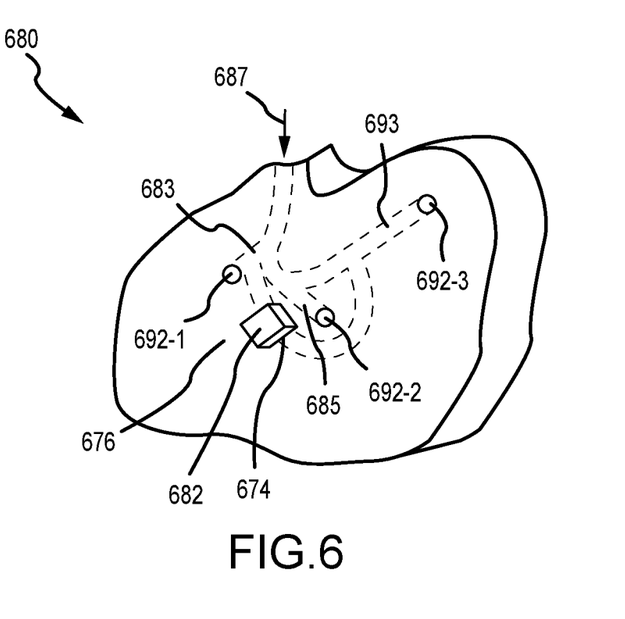
FIG. 6 is a schematic view of a component of a fluid system, in accordance with various embodiments.

Referring now to FIG. 6, a fluid manifold 680 in the form of a body comprising a plurality of passageways between an inlet 687 and one or more outlets, including a first outlet 692-1, a second outlet 692-2 and a third outlet 692-3, is illustrated. Following fabrication by an additive manufacturing process, the fluid manifold 680 may be tested for blockage, in accordance with various embodiments. The fluid manifold 680 may comprise a first passageway 683 coupled to a first outlet 692-1, a second passageway 685 couple to the second outlet 692-2 and a third passageway 694 coupled to the third outlet 692-3, the passageways in this case being disposed in random fashion (e.g., not in series or parallel) relative to one another. A fluid-blocking header 682 having an internal conformal surface 674 configured to mate with an external conformal surface 676 of the fluid manifold 680 may be attached to the fluid manifold 680 adjacent one of the first passageway 683, the second passageway 685, or the third passageway 693. In various embodiments, additional fluid blocking headers may also be positioned about the fluid manifold and adjacent various of the passageways. A plugging media is then introduced into the fluid manifold at the inlet 687. The fluid-blocking header 682 is then activated to freeze the plugging media in the vicinity of the first passageway 683, the second passageway 685, or the third passageway 693, or combinations thereof. The internal conduit running through the fluid manifold 680 (and comprising all the passageways) is then pressurized with a fluid (e.g., the plugging fluid) at the inlet 687 of the component and a fluid flow characteristic at the various outlets of the component is analyzed to assess an occurrence of a blockage within the first passageway 683, the second passageway 685 or any of the other passageways. Following the analysis of the flow characteristics, the fluid-blocking header 682 may be moved to a new location on the fluid manifold 680 and the process repeated.

Figure 7:
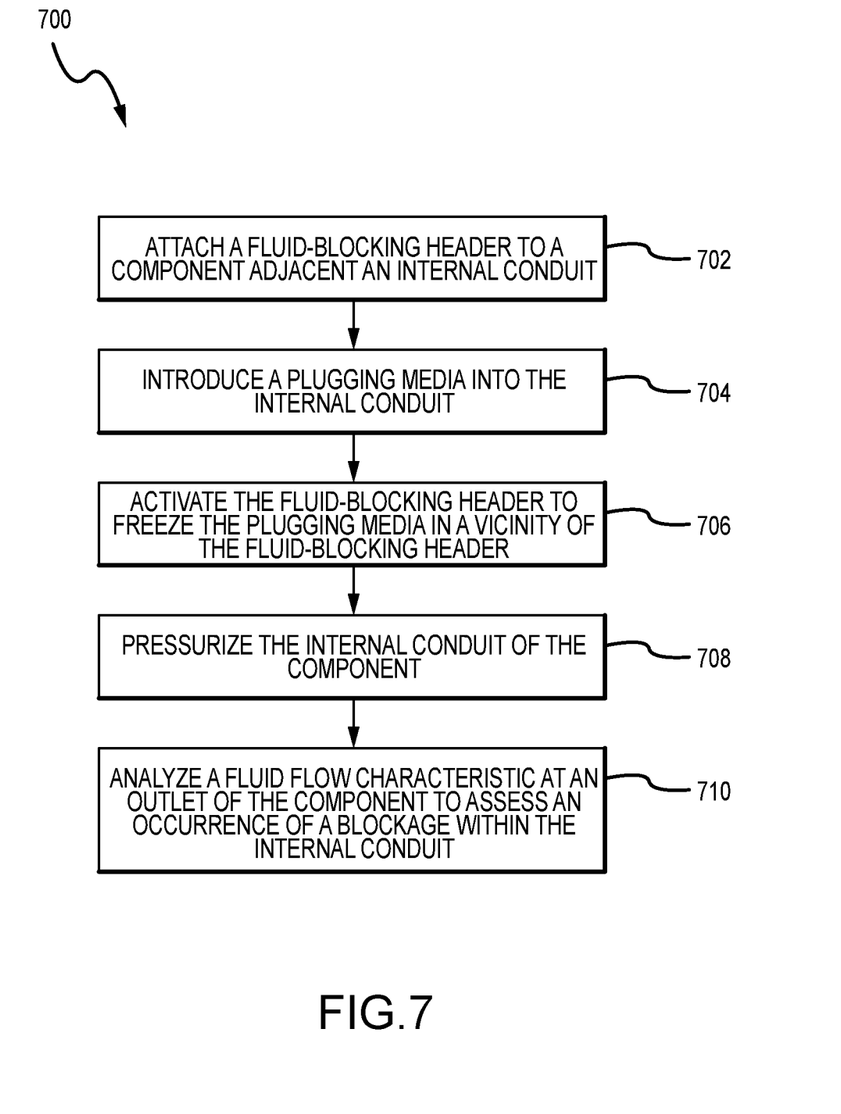
FIG. 7 describes various method steps for inspecting a component made using an additive manufacturing process, the component having an internal conduit, in accordance with various embodiments.

Referring now to FIG. 7, a method 700 for inspecting a component made using an additive manufacturing process, the component having an internal conduit, is described, in accordance with various embodiments. In a first step 702, a fluid-blocking header is attached to the component, the fluid-blocking header having an internal conformal surface configured to mate with an external conformal surface of the component. In a second step 704, a plugging media is introduced into the internal conduit. In a third step 706, the fluid-blocking header is activated to freeze the plugging media in a vicinity of the fluid-blocking header. In a fourth step 708, the internal conduit is pressurized and, in a fifth step 710, a fluid flow characteristic at an outlet of the component is analyzed to assess an occurrence of a blockage within the internal conduit.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A method for inspecting a component made using an additive manufacturing process, the component having an internal conduit, comprising:
   attaching a fluid-blocking header to the component, the fluid-blocking header having an internal conformal surface configured to physically contact an external conformal surface of the component, a coolant inlet on a first side of the fluid-blocking header orthogonal to the internal conformal surface, and a coolant outlet on a second side of the fluid-blocking header, the second side being opposite the first side;
   introducing a plugging fluid into a supply inlet of the internal conduit, the plugging fluid filling the internal conduit;
   activating the fluid-blocking header to freeze the plugging fluid in a vicinity of a first outlet of a plurality of outlets of the internal conduit, including routing a coolant from the coolant inlet, through the fluid-blocking header, and out the coolant outlet;
   pressurizing the plugging fluid in the internal conduit of the component to establish a fluid flow through the internal conduit and out a second outlet of the plurality of outlets; and
   analyzing a fluid flow characteristic at the second outlet of the component to assess whether a blockage has occurred within the internal conduit during the additive manufacturing process.

2. The method of claim 1, wherein the component is an engine casing and the internal conduit includes a fuel rail coupled to the plurality of outlets.

3. The method of claim 1, wherein the analyzing the fluid flow characteristic at the second outlet of the component to assess the occurrence of the blockage within the internal conduit includes measuring at least one of a flow rate or a pressure at one or more of the plurality of outlets other than the first outlet.

4. The method of claim 3, wherein the attaching the fluid-blocking header to the component includes attaching a second fluid-blocking header adjacent the second outlet of the plurality of outlets.

5. The method of claim 4, wherein the analyzing the fluid flow characteristic at the second outlet of the component to assess the occurrence of the blockage within the internal conduit includes measuring at least one of the flow rate or the pressure at one or more of the plurality of outlets positioned between the first outlet and the second outlet.

6. The method of claim 1, wherein the component is a fluid manifold and the internal conduit includes a first passageway fluidly coupled to the first outlet and a second passageway fluidly coupled to the second outlet.

7. The method of claim 6, wherein the attaching the fluid-blocking header to the component includes attaching the fluid-blocking header adjacent one of the first passageway and the second passageway.

8. The method of claim 7, wherein the analyzing the fluid flow characteristic at the second outlet of the component to assess the occurrence of the blockage within the internal conduit includes measuring at least one of a flow rate or a pressure at one or more of the first outlet and the second outlet.

9. The method of claim 8, wherein the first outlet and the second outlet are coupled to a main outlet of the plurality of outlets of the component and analyzing the fluid flow characteristic at the first outlet of the component to assess the occurrence of the blockage within the internal conduit includes measuring at least one of the flow rate or the pressure at the main outlet.

10. A fluid-blocking header configured for testing a component made using an additive manufacturing process, the component having an internal conduit, comprising:
    a body having an internal conformal surface configured to physically contact an external conformal surface of the component to facilitate heat transfer between the fluid-blocking header and the internal conduit within the component, a first side orthogonal to the internal conformal surface, and a second side opposite the first side;
    a cooling inlet on the first side of the body;
    a cooling outlet on the second side of the body; and
    a fluid cooling system coupled to the cooling inlet and the cooling outlet and configured route a coolant from the cooling inlet, through the body, and out the cooling outlet to freeze a plugging fluid within the internal conduit and adjacent the external conformal surface of the component.

11. The fluid-blocking header of claim 10, wherein the component is an engine casing and the internal conduit includes a fuel rail, the fuel rail fluidly coupled to a plurality of fuel injectors spaced circumferentially about the engine casing.

12. The fluid-blocking header of claim 11, wherein the internal conformal surface of the body includes a concave surface configured to mate with a convex surface of the engine casing adjacent the fuel rail.

13. A method for inspecting an engine casing made using an additive manufacturing process, the engine casing including a fuel rail configured to provide a fuel to a plurality of fuel injectors spaced circumferentially about the engine casing, comprising:

attaching a first fluid-blocking header to the engine casing, the first fluid-blocking header having an internal conformal surface configured to physically contact an external conformal surface of the engine casing, a coolant inlet on a first side of the first fluid-blocking header orthogonal to the internal conformal surface, and a coolant outlet on a second side of the first fluid-blocking header, the second side being opposite the first side;

introducing a plugging fluid into a fuel supply inlet of the engine casing and into the fuel rail, the plugging fluid filling the fuel rail;

activating the first fluid-blocking header to freeze the plugging fluid in a vicinity of the first fluid-blocking header, including routing a coolant from the coolant inlet, through the first fluid-blocking header, and out the coolant outlet;

pressurizing the fuel rail at the fuel supply inlet of the engine casing; and analyzing a fluid flow characteristic at a first fuel injector of the plurality of fuel injectors whether a blockage has occurred within the fuel rail during the additive manufacturing process.

14. The method of claim 13, wherein the attaching the first fluid-blocking header to the engine casing includes attaching the first fluid-blocking header adjacent the first fuel injector of the plurality of fuel injectors and the activating the first fluid-blocking header to freeze the plugging fluid in the vicinity of the first fluid-blocking header.

15. The method of claim 14, further comprising attaching a second fluid-blocking header adjacent a second fuel injector of the plurality of fuel injectors.

16. The method of claim 15, wherein the analyzing the fluid flow characteristic at an outlet of the engine casing to assess the occurrence of the blockage within the fuel rail includes measuring at least one of a flow rate or a pressure at one or more of the plurality of fuel injectors positioned between the first fuel injector and the second fuel injector.

* * * * *